United States Patent Office 3,087,920
Patented Apr. 30, 1963

3,087,920
COLD-WATER-SOLUBLE POLYVINYL ALCOHOL
Hideo Suzumura and Hisao Miyahara, Kurashiki City, Japan, assignors to Kurashiki Rayon Co., Ltd., a corporation of Japan
No Drawing. Filed Oct. 7, 1960, Ser. No. 61,081
Claims priority, application Japan Oct. 12, 1959
7 Claims. (Cl. 260—91.3)

The invention relates to cold-water-soluble partially-saponified polyvinyl alcohol and to a method for producing it, and the invention is more particularly concerned with a cold-water-soluble partially-saponified polyvinyl alcohol in finely-divided, e.g. powder, form.

Polyvinyl alcohol has recently come to be used extensively as a base for various types of adhesives and finishing agents for woven fabrics because of the binding powder of its aqueous solutions, and because of the tenacity, gloss, agreeable feel, and like desirable characteristics of film obtained from aqueous solutions of polyvinyl alcohol. However, known polyvinyl alcohols generally require the use of heat to put them into solution in water or they are, at best, dissolved in cold water without difficulty.

As is well known, an aqueous solution of fully saponified polyvinyl alcohol can not be obtained unless dissolution is effected by heating. Accordingly, in seeking a polyvinyl alcohol of cold-water-solubility, partially-saponified polyvinyl alcohol has been produced.

For example, when 2.5 parts of polyvinyl alcohol of a degree of polymerization of 1700 and partially saponified to the extent of 87.42 mol percent are mixed with 100 parts of water at 20° C., 85.9% goes into solution in 30 minutes. In this case, however, it is necessary to impart to the mixture of water and polyvinyl alcohol a relatively violent agitation of more than 300 revolutions per minute. When such agitation is not provided, or when the agitation is mild, the paritally-saponified polyvinyl alcohol will rapidly swell in the water as it comes into contact with the water, with the resultant formation of gels which enclose and trap undissolved polyvinyl alcohol particles, giving rise to undissolved powder lumps. When such undissolved powder lumps form, further dissolution is greatly retarded. There has existed, therefore, an unfilled need for a polyvinyl alcohol which is freely soluble in cold water without need for violent agitation and like special techniques.

It is thus an object of this invention to provide polyvinyl alcohol which will rapidly dissolve in cold water without need for violent agitation and without the formation of lumps.

It is another object of the invention to provide a process of producing polyvinyl alcohol of high cold-water-solubility.

In accordance wtih the invention, partially saponified polyvinyl alcohol is combined with diamino-stilbene compounds of the type used as optical bleaching agents and with surface-active agents. The components may be combined in solid form or in solution. Thus, to prepare a composition from these components in solid form, partially-saponified polyvinyl alcohol is crushed to a powder of 50–120 mesh size, and there are combined with 100 parts by weight of this powder 0.5 to 5 parts by weight of an optical bleaching agent of the diamino-stilbene type and 1 to 3 parts by weight of a surface active agent, such as a fatty acid ester of a polyoxyethylenesorbitan, the several components being homogeneously mixed. The product thus obtained melts smoothly and easily in cold water, e.g. at a temperature of 25° C. and below, in a short period of time with only light stirring. Advantageously, the powdered partially-saponified polyvinyl alcohol is heat-treated, e.g. at 50° to 120° C., for a period of time varying from 20 hours to a few minutes, in inverse proportion to the temperature, prior to mixing with the other components.

When a finely-divided powder of partially-saponified polyvinyl alcohol is dissolved in water, it is important to prevent the formation of undissolved powder lumps and to effect complete dissolution quickly. In doing so, the individual polyvinyl alcohol particles must be prevented from adhering to one another so that each particle will be free to dissolve smoothly.

However, partially-saponified polyvinyl alcohol often exhibits the formation of undissolved powder lumps because of its property of rapid swelling. Therefore, prevention of the formation of undissolved powder lumps may be achieved by retarding this swelling. We have conducted a series of experiments involving the heating of partially-saponified polyvinyl alcohol and we have found that this procedure is effective for this purpose but we have also observed that the solubility drops upon such heat-treatment, as shown in the following table.

| Temperature, °C. | Time, Min. | Solubility, Percent |
|---|---|---|
| No heating | | 97.2 |
| 50 | 1,200 | 94.6 |
| 70 | 1,200 | 94.0 |
| 100 | 60 | 94.4 |
| 120 | 6 | 88.9 |
| 150 | 5 | 87.6 |

In the foregoing table, the partially-saponified polyvinyl alcohol was 88 mol percent saponified and had a degree of polymerization of 1700. The concentration of each solution was 2% and dissolution was effected at 40° C. during the course of 60 minutes with agitation at the rate of 300 revolutions per minute.

It will be understood that it is not desirable to effect excessive heat-treatment since it retards the cold water-solubility. However, heat-treatment to the above specified extent is useful in preventing the formation of undissolved powder lumps.

Thus, heat-treatment of the partially-saponified polyvinyl alcohol used in accordance with this invention is advantageous, but we have found that complete solution can be effected in a very short period of time merely with mild agitation in cold water when use is made of a partially-saponified polyvinyl alcohol having admixed with it small but effective amounts of a diamino-stilbene optical bleaching agent and of a surface active agent as described above.

To combine the several components by means of a solvent, 100 parts by weight of the crushed partially-saponified polyvinyl alcohol described above, but preferably having a particle size of 100 mesh or below, are mixed with 100 parts by weight of a solvent, e.g. methanol, containing 0.5 to 3 parts of a diamino-stilbene optical bleaching agent and 1 to 3 parts of a surface active agent, the entire composition being homogeneously mixed. The mixture is then left at 35° to 45° C. for 30–60 minutes, and the solvent, e.g. methanol is separated, e.g. by evaporation.

The product thus obtained is white in color and dissolves freely and easily in cold water in a short period of time with only mild stirring.

Alternatively, the partially saponified polyvinyl alcohol is produced by conventional saponification of polyvinyl acetate in a methanol solution containing an optical bleaching agent of the diamino-stilbene type dissolved in it in the relative relationships described above. The surface active agent may also be present in the saponification solution or it may be mixed after saponification in the relatively relationships specified above. The resulting product exhibits the same solubility characteristics as the products previously described.

The partially-saponified polyvinyl alcohol used in accordance with this invention to prepare cold-water-soluble polyvinyl alcohol is produced by conventional techniques from polyvinyl esters, such as polyvinyl acetate, by known saponification procedures as described, of example, in Scott et al. U.S. Patent No. 2,266,996 and Bryant et al. U.S. Patent No. 2,668,809. As is known in the art, a "partially-saponified" polyvinyl alcohol is the product of the hydrolysis of a polyvinyl ester, e.g. polyvinyl acetate, in which less than all of the ester groups, e.g. acetate groups, have been converted to hydroxyl groups. As explained in Scott et al. 2,266,996, the saponification or hydrolysis reaction is stopped by neutralizing the actalyst when the desired percentage conversion has occurred. The partially-saponified polyvinyl alcohols which are suitably used in accordance with this invention are at most 90 percent saponified or hydrolyzed but they are are sufficiently saponified to be water-soluble which, according to Bryant et al. 2,668,809, requires the conversion of at least about 75% of the ester groups into hydroxyl groups. Their degree of polymerization, upon which viscosity is dependent, may vary widely and is selected in relation to the use to which the polyvinyl alcohol is to be put, as known in the art and as discussed in Scott et al. and Bryant et al.

While the reason for the surprising action of the diamino-stilbene compound and the surface-active agent is not fully understood, it is believed that the particles of the partially-saponified polyvinyl alcohol become dispersed in water by the action of the surface active agent and that they then react instantaneously with the diamino-stilbene optical bleaching agent, forming a three-dimensional bridge, thereby assuming a gel form. The surfaces of the polyvinyl alcohol particles thus gelled are deficient in mutual adhesiveness, and the individual particles do not coagulate, but remain individually suspended in the water even after absorbing water and after swelling. Meanwhile, it is believed that water permeates through the surface of the particles and becomes dispersed inside the particles in a short period of time, with the result that complete solution thus occurs.

The cold-water-soluble polyvinyl alcohol composition produced in accordance with this invention is particularly useful for all purposes for which a water-soluble polyvinyl alcohol is desired, e.g. in adhesives, and in finishing agent for fabrics, but it is by no means limited to such uses. The cold-water-soluble polyvinyl alcohol composition may be combined with fillers and pigments such as clay, kaolin, and the like in conventional manner.

A polyvinyl alcohol solution sometimes has a tendency to foam and is somewhat difficult to handle in that case. In order to check this foaming, the use of 0.05 to 0.3 part by weight of a fatty acid, e.g. stearic acid admixed with a polyoxyethylene alkyl ether or ester per 100 parts of partially-saponified polyvinyl alcohol is highly effective.

The invention will be further understood from the following specific examples of practical application. However, it will be understood that these examples are not to be construed as limiting the scope of the present invention in any manner. In these examples, all parts are by weight, unless otherwise indicated.

*Example 1*

One hundred parts of 90% partially-saponified polyvinyl alcohol having a degree of polymerization of 1700 were crushed to a particle size of 50 to 100 mesh, and heat-treated at 120° C. for 6 minutes. Then 2 parts of 4,4'-diaminostilbene-2,2'-disulfonic acid sodium salt, sold under the trade-name "Kaycoll BA," and 2 parts of polyoxyethylenesorbitan laurate were uniformly mixed with the polyvinyl alcohol.

The product thus obtained underwent complete dissolution in water in 5 to 8 minutes upon light stirring by hand to form aqueous solutions of 2 to 5% concentration.

*Example 2*

One hundred parts of 88% partially-saponified polyvinyl alcohol having a degree of polymerization of 2000 were pulverized to a particle size of about 80 mesh and then mixed with 0.1 part of a fatty acid containing 1% of a polyoxyethylenealkyl ether and 2.3% of a polyoxyethylenealkyl ester, and with 2 parts of polyoxyethylenesorbitan laurate, while heating at 70° C. Then 1 part of the diamino-stilbene optical bleaching agent described in Example 1 was uniformly intermixed with the foregoing composition. The resultant product dissolved freely and completely in water in 6 to 10 minutes to form solutions of 2 to 5% concentration and very little foaming was observed.

*Example 3*

One hundred parts of 80% partially-saponified polyvinyl alcohol having a degree of polymerization of 1700 were pulverized to a particle size of about 80 mesh and were mixed with 1 part of the optical bleaching agent of the diamino-stilbene type described in Example 1, with 0.2 part of the oil preparation described in Example 2, and with 100 parts of methanol containing in solution 2 parts of the surface active agent, viz. polyoxyethylene sorbitan laurate. All of the components were thoroughly mixed and then the methanol was evaported in the course of 30 minutes by application of heat. The product thus obtained was pure white in color and attractive in appearance and water solutions of 2 to 5% concentration were readily prepared in 5 to 10 minutes.

*Example 4*

In 1400 parts of a methanol solution of polyvinyl acetate (15% concentration), 1.5 part of an optical bleaching agent of the diamino-stilbene type, viz. the compound described in Example 1, was dissolved, and the polyvinylacetate was saponified in conventional manner to produce an 88% partially-saponified polyvinyl alcohol having a degree of polymerization of 1700. This polyvinyl alcohol was homogeneously mixed with 2 parts of polyoxyethylenesorbitan laurate. The mixture was then dried and pulverized. This product readily formed 2 to 5% aqueous solutions by simply mixing in 5 to 10 minutes.

Diamino-silbene compounds of the type employed as optical bleaching agents which are employed in accordance with the present invention are well-known compounds and are described, for example, by F. G. Villaume in The Journal of the American Oil Chemists' Society, vol. XXXV, No. 10 (October 1958), pp. 558–566. In general, these compounds are classified as triazinyldiaminostilbenes, as exemplified in FIG. 11 of Villaume, and aroyldiaminostilbenes, as exemplified in FIG. 12 of Villaume.

The surface-active agents which are employed in combination with the diamino-stilbene compounds to produce the cold-water-soluble partially-saponified polyvinyl alcohol of this invention are, in general, any of the many known anionic, non-ionic, and cationic surface-active agents such as sodium stearate (anionic), polyoxyethylenedodecyl ether (non-ionic), and dodecyltrimethyl ammonium chloride (cationic). By surface-active agents are meant generally those compounds possessing a hydrocarbon group which is hydrophobic and a soluble group which is hydrophylic. The nature of the solubilizing group determines the classification of the surface-active agent as anionic, cationic, and non-ionic. The sodium salts of the fatty acids (soaps) and the corresponding alcohol sulfonates, sulfates, phosphates, and thiosulfates are typical of the anionic class whose aqueous dispersions are negatively charged. Surface-active agents in which cations act as the solubilizing groups are those in which the solubilizing action depends on amino or ammonium groups. Cetyl pyridinium chloride is a typical example of a cationic surface-active agent, the aqueous dispersions of which are positively charged. The non-ionic surface agents do not form salts with acids of bases, and, under normal conditions, their dispersions do not carry electrical or ionic charges. Solubilization of this class of agents is achieved by a series of hydroxyl ether groups, and the hydroxyl polyethylene ether of diamylphenol, is a commercial example of another non-ionic surface-active agent. As other suitable surface-active agents, reference may also be made to anionic surface-active agents of the alkylaryl sulfonate type such as Nacconol NRFS and Santomerse D, and alcohol sulfates such as sodium lauryl sulfate and triethanolamine lauryl sulfate. The alkyl phosphate salts are also suitable anionic surface-active agents for the purposes of this invention. Included among cationic surface-agents are the sulfosuccinamates such as n-octadecyl disodium sulfosuccinamate and the corresponding tetrasodium sulfosuccinamate. These materials are marketed by The American Cyanamid Co. under the trade-name Aerosol. Other suitable surface-active agents include the fatty amines of the type represented by Alkamine S.J. (marketed by Amalgamated Chemical Company), and the hexitol oleates, such as anhydrohexitol partial oleate marketed under the name Ariacel A (Atlas Powder Company). Most advantageously, however, and preferred over all other surface-active agents, are compounds of the polyoxyethylene type, such as polyoxyethylene esters and ethers as exemplified by polyoxyethylene monostearate, polyoxyethylene sorbitan mono-oleate known under the names "polyoxy 40 stearate" and "polysorbate 80," respectively, as well as the surface-active agents sold under the trade-name "Tween," some of which are described on page 450 of Zimmerman and Lavine, "Handbook of Material Trade Names."

In the embodiment of the process of the invention wherein the several components are mixed in solution, any inert solvent for all of the components may be employed but lower-alkyl alcohols, such as methanol, are suitably employed. When the components are mixed prior to saponification of polyvinyl ester to form polyvinyl alcohol, any conventional saponification procedure may be employed to form the polyvinyl alcohol. In addition to the Scott et al. and Bryant et al. patents mentioned above, typical suitable saponification methods are described, for example, in Bristol U.S. Patent 2,700,035, Waugh et al. U.S. Patent 2,642,419 and Germain U.S. Patent 2,643,994, saponification being stopped in conventional manner, e.g. by neutralizing the catalyst, when the desired partial degree of saponification or hydrolysis has been reached.

Thus, the conditions and the relative relationships set forth in the examples are those preferred in carrying out the process of this invention, but it will be understood that other conditions and relationships may be used within the scope of the invention. In general, unless otherwise indicated, conventional operations and techniques are suitably employed.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:
1. A cold-water-soluble polyvinyl alcohol which comprises an intimate admixture of 100 parts by weight of a partially saponified polyvinyl alcohol having a hydrolysis of 75 to 90 percent and a particle size not exceeding 100 mesh, 0.5 to 5 parts by weight of 4,4'-diaminostilbene-2,2'-disulfonic acid sodium salt, and 1 to 3 parts by weight of a surface active agent.
2. The process of producing a polyvinyl alcohol having improved cold-water-solubility which comprises combining 100 parts by weight of a partially saponified polyvinyl alcohol having a hydrolysis of 75 to 90 percent and a particle size not exceeding 50 mesh with 0.5 to 5 parts by weight of 4,4'-diaminostilbene-2,2'-disulfonic acid sodium salt and 1 to 3 parts by weight of surface active agent.
3. A cold-water-soluble polyvinyl alcohol which comprises an intimate admixture of 100 parts by weight of a partially saponified polyvinyl alcohol having a hydrolysis of 75 to 90 percent and a particle size not exceeding 50 mesh, 0.5 to 5 parts by weight of 4,4'-diaminostilbene-2,2'-disulfonic acid sodium salt, and 1 to 3 parts by weight of a surface active agent.
4. A process of producing a polyvinyl alcohol having cold-water-solubility which comprises combining 100 parts by weight of a partially saponified polyvinyl alcohol having a hydrolysis of 75 to 90 percent and a particle size not exceeding 50 mesh, 0.5 to 5 parts by weight of a diaminostilbene disulfonic acid sodium salt, and 1 to 3 parts by weight of a surface active agent.
5. A cold-water-soluble polyvinyl alcohol which comprises an intimate admixture of 100 parts by weight of a partially saponified polyvinyl alcohol having a hydrolysis of 75 to 90 percent and a particle size not exceeding 50 mesh, 0.5 to 5 parts by weight of a diaminostilbene disulfonic acid sodium salt, and 1 to 3 parts by weight of a surface active agent.
6. A cold-water-soluble polyvinyl alcohol which comprises an intimate admixture of 100 parts by weight of a partially saponified polyvinyl alcohol having a hydrolysis 75 to 90% and a particle size not exceeding 100 mesh, 0.5 to 5 parts by weight of 4,4'-diaminostilbene-2,2'-disulfonic acid sodium salt, and 1 to 3 parts by weight of a non-ionic surface-active agent selected from the group consisting of polyoxyethylene ethers and polyoxyethylene esters.
7. A process of producing a polyvinyl alcohol having improved cold-water-solubility which comprises combining 100 parts by weight of a partially saponified polyvinyl alcohol having a hydrolysis of 75 to 90% and a particle size not exceeding 100 mesh with 0.5 to 5 parts by weight of 4,4'-diaminostilbene-2,2'-disulfonic acid sodium salt, and 1 to 3 parts by weight of a surface-active agent.

References Cited in the file of this patent
UNITED STATES PATENTS

| | | |
|---|---|---|
| 1,971,662 | Schmidt | Aug. 28, 1934 |
| 2,362,026 | Quist | Nov. 7, 1944 |